Nov. 28, 1933.　　　C. L. HALLADAY　　　1,937,197
BUMPER CONSTRUCTION AND METHOD OF MAKING THE SAME
Filed Aug. 25, 1932
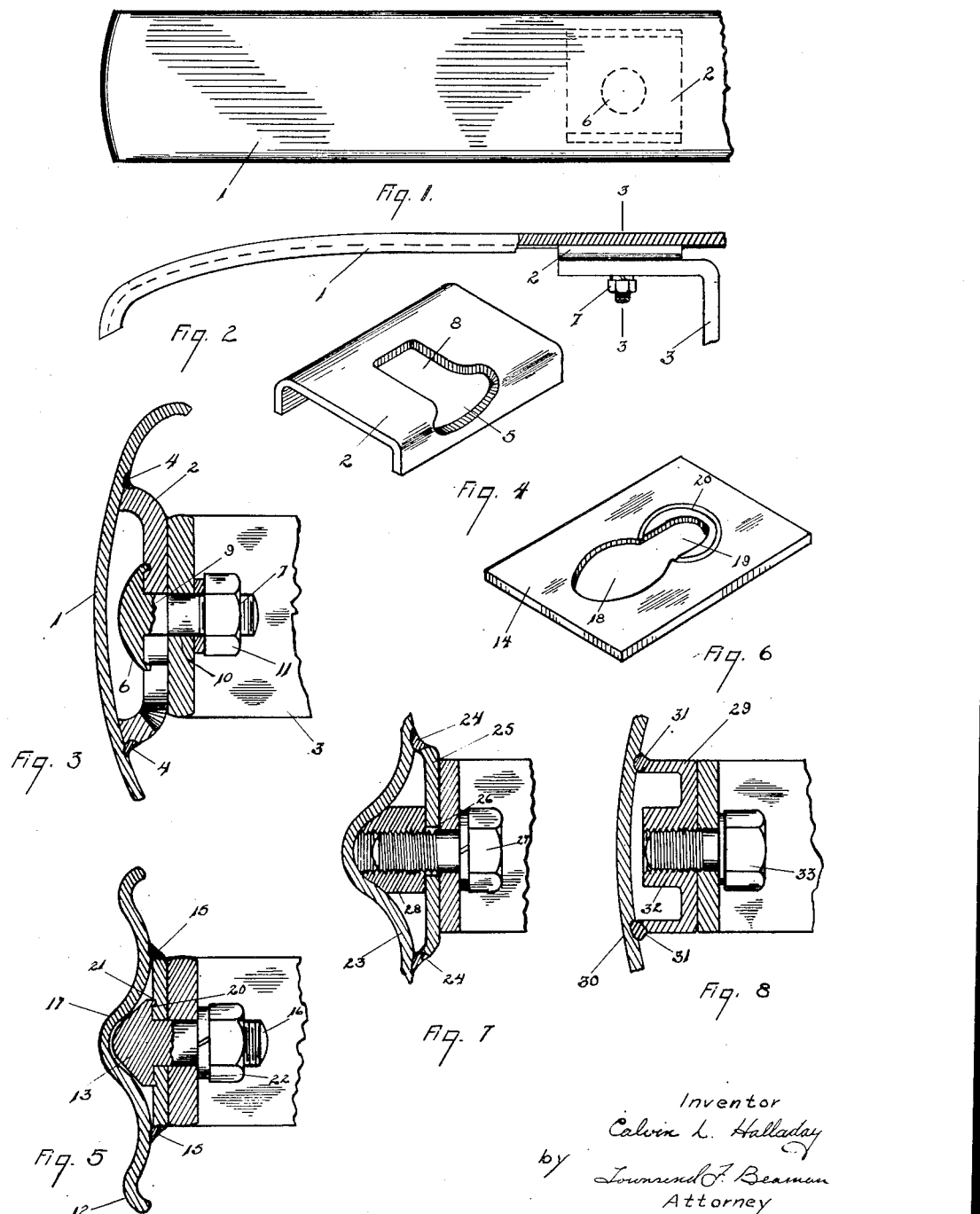
Inventor
Calvin L. Halladay
by Townsend F. Beaman
Attorney Patented Nov. 28, 1933

1,937,197

UNITED STATES PATENT OFFICE 1,937,197

BUMPER CONSTRUCTION AND METHOD OF MAKING THE SAME

Calvin L. Halladay, Jackson, Mich.

Application August 25, 1932. Serial No. 630,373

12 Claims. (Cl. 293—55)

The present invention relates to improvements in the manufacture of bumpers for motor vehicles and the like.

Herebefore, it has been necessary, in order to support the impact bar of the bumper construction from the mounting bar, to either pass bolts or the like directly through the impact bar or to clamp the impact bar to the mounting bar by brackets or the like in contact with the outside face of the impact bar. Obviously, any form of securing member superimposed upon the face of the impact bar is detrimental, from the artistic viewpoint, to the flowing ribbon of plated steel which the face of the impact bar is capable of depicting. Furthermore, aside from detracting from the appearance of the bumper, the strength and durability is decidedly impaired at the sections where bolts or the like are passed through the impact bar.

Thus it became the primary object of this invention to provide a bumper construction and a process for fabricating this construction which will eliminate the objectional features present in the prior art set forth herebefore.

More specifically stated, one of the objects of this invention is to provide a bumper construction in which the mounting bar is secured to the back face of the impact bar, leaving the plated front face free from and uninterrupted by any visual securing means.

Another object of this invention is to provide a bumper construction in which a bracket is welded to the high carbon steel impact bar and acts as an anchorage to which the mounting bar may be detachably secured.

A further object of this invention is to provide a bumper construction of sufficient strength and durability to meet the requirements of the trade in which a low carbon bracket is welded to a high carbon impact bar by a low carbon steel filler.

These and other objects and advantages will appear as the description of the invention proceeds. It is to be distinctly understood, however, that I do not desire to be limited to the exact details hereinafter set forth but that I intend to include as part of my invention all such changes and modifications which would occur to those skilled in the art and would fall within the scope of the claims.

In the accompanying drawing wherein several of many possible types of brackets are shown employed to secure the impact bar to the mounting bar, Fig. 1 is a front elevational view of the impact bar shown free of any visual securing member.

Fig. 2 is a bottom view of Fig. 1 with the impact bar shown broken adjacent the welded bracket.

Fig. 3 is a sectional view taken on line 3—3 of Fig. 2 of the welded bracket in position.

Fig. 4 is a perspective view of the bracket shown in Fig. 3.

Fig. 5 is a modified form of construction in which the head of the bolt conforms to the contour of the impact bar.

Fig. 6 is a perspective view of the bracket shown in Fig. 5.

Fig. 7 is a modification in which the nut conforms to the contour of the impact bar.

Fig. 8 is a further modification in which the welded bracket is provided with a threaded case.

Before reference is made to the structure details, my improved process of fabrication will be described in detail.

Bumper construction for vehicles is conventionally fabricated from high carbon spring steel having a carbon range from substantially 60 to 105. In view of the fact that there are no known methods of successfully welding together steel of higher carbon content than 60, it has been necessary to support the impact bar from the mounting bar by means other than welding. These means heretofore have always resulted in a superimposed surface upon the face of the impact bar.

In carrying my improved method of fabrication into operation, the impact bar as received from the rolling mill, prior to any heat treatment, is placed in a suitable jig and a bracket or the like, having a carbon range from 10 to 25, is welded to the back face. While my invention is not limited, in its broadest conception to any particular method of welding, the employment of any type of electric arc and gaseous weld being anticipated, exceptional results have been obtained through the employment of an electric arc in which the impact bar constitutes the positive electrode and the filling bar the negative. By employing a filler bar, as a negative electrode, of low carbon steel having a carbon range of substantially 13 to 18, the greatest heat will be generated in the zone of the low carbon filler and bracket, possessing the higher melting point, and the lowest temperature of the weld will be in the locality of the high carbon steel impact bar, having the lower melting point. This has the effect of producing a well balanced weld. Considered in its broad aspect my method of securing a bracket to the back face of an impact bar is concerned with a selection of a bracket and filler characterized by the fact that they are of such quality as to enable a suitable bond to be formed by the bracket and the impact bar with the filler. Thus considered, my invention includes the employment of both ferrous and non-ferrous welds.

As shown in the drawing the weld between the bracket and the impact bar is preferably longitudinal of the bar to eliminate the formation of any transverse bands of weakness that might result from the decarbonizing of the bar during the welding operation. However, I do not wish to be limited to any particular type of weld.

Following the welding operation, the weld is normalized or annealed by increasing the temperature of the impact bar and bracket and slowly cooling the same to below the critical range. The temperature is then raised to 1400–1700 F. and the bumper is quenched to increase the hardness of the high carbon impact bar; the low carbon weld and bracket not being effected by the quenching operation. In practice it has been found that the normalizing and the heat treatment prior to quenching can be accomplished in a single step; the raising of the temperature through the critical range and the slight air cooling prior to quenching apparently being sufficient to season the weld. Following the quenching operation, the bumper is tempered in the usual manner.

In the accompanying drawing is illustrated several practical forms of bracket and fastenings which may be satisfactorily employed in carrying out my improved method of fabrication hereinbefore described.

As illustrated, an impact bar 1 of any desired shape or form, preferably fabricated from spring steel having a 60–105 carbon range, has welded thereto a bracket 2. The bracket 2 may be of any suitable size and shape, but is preferably of a shape permitting the mounting bar 3 to be secured as adjacent the impact bar 1 as is possible in order to reduce the moment in the bracket upon the weld to a minimum, and render the same more inconspicuous.

Welding of the bracket 2 to the impact bar 1 is preferably done along lines 4 longitudinally of the impact bar 1. When the bracket 2 is of low carbon steel and a filler of low carbon steel is being employed as a negative electrode in arc welding, it will be obvious that in making the weld along line 4, the negative electrode will be held adjacent the side of the bracket 2. In view of the hottest portion of the arc being at the negative electrode, the material having the highest melting temperature, namely, the bracket and filler, will be subjected to the highest temperature, and the high carbon impact bar, having the lowest melting point will be subjected to the lowest temperature. Thus a balanced weld is effected.

As it is highly essential in bumper construction, there be no relative movement or looseness between the impact and mounting bars, it is desirable to construct the bracket in some manner to prevent rotary or transverse movement of the detachable fastening means employed to secure the bracket 2 to the bar 3. In Fig. 4, the bracket 2 is shown provided with an aperture 5, through which the head 6 of the bolt 7 is adapted to be passed. The aperture 5 is provided with a restricted throat 8 adapted to snugly receive the squared shank portion 9 of the bolt 7 to prevent rotation of the bolt when passed through the aperture 10 in the bar 3 and tightened into position by the nut 11. Aside from the weldability of the low carbon bracket 2, the relative degree of hardness between the low carbon bracket and the high carbon mounting bar is such that upon the tightening of the nut 11, there is a microscopic flowing of the metal constituting the bracket, which materially assists in retaining a fixed noiseless connection between the bracket and the mounting bar.

In Figs. 5 and 6 a modified construction is shown in which the impact bar 12 has a decided concave portion 17. A substantially flat bracket 14 is superimposed upon the concave portion 17 and welded to the impact bar at 15. The bolt 16 has a cylindrical head 13 and is contoured on two sides to conform to the portion 17 and is thus prevented from rotating when in the position shown in Fig. 5. An aperture 18 is provided in the bracket 14 through which the head of the bolt may be passed. A restricted throat 19 opens into the aperture 18 longitudinally of the impact bar into which the shank of the bolt 16 may be transversely inserted. In order to lock the shank of the bolt in the throat 19, a circular groove 20 is coined in the bracket 14 concentrically with the semicircular portion of the throat. A bead 21 is provided on the base of the bolt 17, which is of circular cross section, and the bead is drawn into the groove 20 to prevent transverse movement of the bolt after the nut 22 is drawn up.

A further modification is shown in Fig. 7 in which an impact bar 23 of contour similar to the bar 12, has welded thereto at 24, a substantially flat bracket 25 provided with a circular aperture 26 to receive the shank of the screw 27. A cylindrical nut 28, which may be either removably or fixedly secured in position, is provided on two sides with a contour conforming to that of the bar 23 to prevent rotation relative thereto.

In Fig. 8 a bracket 29 is illustrated welded to the impact bar 30 at 31. The bracket 29 is provided with internally threaded boss 32 to receive the screw 33.

Although at the present time it is considered imperative that the mounting bar and impact bar be removably secured in order to facilitate installation and to avoid electro-plating the mounting bar, the welding of the mounting bar directly to the bracket welded to the impact bar is anticipated and considered within the scope of my invention.

Furthermore, regardless of the specific form of the bracket and fastening means, the essential characteristics of my invention reside in providing a closely fitted bracket having associated provisions to prevent relative movement between the bracket and the fastening means.

Having thus described my invention, what I claim as new and desired to protect by Letters Patent is:

1. In a bumper construction for vehicles and the like, the combination with a mounting bar, of an impact bar having spaced longitudinal edges, a member integrally associated solely with said impact bar inwardly from said edges, said member being located upon the back face of said impact bar and entirely concealed thereby as viewed from the front face, means securing said member to said mounting bar to support said impact bar, said member in the assembled state being located between said impact and mounting bars.

2. In a bumper construction for vehicles and the like, the combination with a mounting bar, of an impact bar having spaced longitudinal edges, a bracket member integrally attached at spaced points to the back face of said impact bar inwardly of the edges thereof and being entirely concealed thereby as viewed from the front face, a portion of said member being spaced from the back face of said impact bar to receive securing means, means for securing said portion of said member to said mounting bar to support said impact bar, said member in the assembled state being located between said impact and mounting bars.

3. In a bumper construction for vehicles and the like, the combination with a mounting bar, of an impact bar having spaced longitudinal edges, a bracket member integrally attached to the back face of said impact bar inwardly of the edges thereof and being entirely concealed thereby as viewed from the front face, a portion of said member being spaced from the back face of said impact bar to receive securing means, and means for securing said portion of said member to said mounting bar to support said impact bar.

4. In a bumper construction for vehicles and the like, the combination with a mounting bar, of an impact bar, a bracket member integrally attached to the back face of said impact bar and being entirely concealed thereby as viewed from the front face, a portion of said member being spaced from said back face to receive securing means, means for securing said portion of said member to said mounting bar to support said impact bar, said member in the assembled state being located between said impact and mounting bars.

5. In a bumper construction for vehicles and the like, the combination with a mounting bar, of an impact bar with spaced longitudinal edges having a face portion presenting substantially a vertical resisting surface, an attachment member integrally associated with said impact bar inwardly from said edges, said member being attached to the back side of said face portion and entirely concealed thereby as viewed from the front of the face portion, and means securing said member to said mounting bar to support said impact bar.

6. In a bumper construction for vehicles and the like, the combination with a mounting bar, of an impact bar, a bracket member integrally associated solely with said impact bar and located upon the back face thereof and entirely concealed thereby as viewed from the front face, said bracket being sufficiently spaced from said impact bar to receive the anchorage of a bolt, and a bolt securing said member to said mounting bar.

7. In a bumper construction for vehicles and the like, the combination with a mounting bar of high carbon steel, of an impact bar of high carbon steel, an intermediate bracket of easily weldable material welded solely to and located upon the back face of said impact bar and entirely concealed thereby as viewed from the front face, a portion of said bracket being sufficiently spaced from said impact bar to receive the anchorage of a bolt, and a bolt held against transverse movement in said bracket securing said bracket and mounting bar together.

8. In a bumper construction for vehicles and the like, the combination with a mounting bar of high carbon steel, of an impact bar of high carbon steel, an intermediate bracket of easily weldable material welded solely to and located upon the back face of said impact bar and entirely concealed thereby as viewed from the front face, a portion of said bracket being sufficiently spaced from said impact bar to receive the anchorage of a bolt, and a bolt held against transverse and rotary movement in said bracket, securing said bracket and mounting bar together.

9. In a bumper construction for vehicles and the like, the combination with a mounting bar of high carbon steel, of an impact bar of high carbon steel, an intermediate bracket of easily weldable material welded solely to and located upon the back face of said impact bar and entirely concealed thereby as viewed from the front face, a portion of said bracket being sufficiently spaced from said impact bar to receive the anchorage of a bolt, an aperture in said bracket through which a bolt anchorage is adapted to be passed having a restricted throat, and a bolt having its shank located in said throat securing said bracket and mounting bar together.

10. In a bumper construction for vehicles and the like, the combination with a mounting bar, of an impact bar, an intermediate member integrally attached to the back face of said impact bar at spaced points and being entirely concealed thereby as viewed from the front face, said member being sufficiently spaced from said impact bar between the points of attachment therewith to receive the anchorage of a bolt, and a bolt securing said member to said mounting bar.

11. In a bumper construction for vehicles and the like, the combination with a mounting bar, of an impact bar, a bracket member integral with said impact bar and located entirely upon the back face thereof, a portion of said bracket being sufficiently spaced from said impact bar to receive the anchorage of a bolt, an aperture in said bracket through which the body of the bolt is passed, a groove located in said bracket adjacent said aperture, and a bolt securing said mounting bar to said bracket passed through said aperture and having an anchorage provided with a bead located in and conforming to said groove whereby said bolt is held against transverse movement in said aperture.

12. In a bumper construction for vehicles and the like, the combination with a mounting bar of high carbon steel, of an impact bar of high carbon steel having a concaved back face portion, a substantially flat apertured bracket member superimposed upon said concaved back face portion and welded thereto, and a bolt shank passed through said aperture, having one of its anchorages inserted between said bracket and said back face portion conforming to the contours of the latter, securing said mounting bar to said bracket.

CALVIN L. HALLADAY.